US00RE40982E

(19) United States
(12) Reissued Patent
Na et al.

(10) Patent Number: US RE40,982 E
(45) Date of Reissued Patent: Nov. 17, 2009

(54) DIGITAL BROADCAST RECEIVING/ RECORDING APPARATUS AND METHOD

(75) Inventors: Il-ju Na, Suwon (KR); Jeong-tae Kim, Suwon (KR)

(73) Assignee: Samsung Electronics Co., Ltd., Suwon-si (KR)

(21) Appl. No.: 10/762,189

(22) Filed: Jan. 22, 2004

Related U.S. Patent Documents

Reissue of:
(64) Patent No.: 6,366,731
Issued: Apr. 2, 2002
Appl. No.: 08/941,539
Filed: Sep. 30, 1997

(30) Foreign Application Priority Data

Apr. 14, 1997 (KR) ..... 97-13587

(51) Int. Cl.
*H04N 5/91* (2006.01)

(52) U.S. Cl. ..... 386/83; 386/46; 348/726
(58) Field of Classification Search ..... 386/1, 386/35, 46, 83, 52, 95–96, 109–111; 725/139, 725/141, 142
See application file for complete search history.

(56) References Cited

U.S. PATENT DOCUMENTS

| | | | | |
|---|---|---|---|---|
| 4,808,992 A | | 2/1989 | Beyers, Jr. et al. | |
| 5,488,427 A | | 1/1996 | Kayashima et al. | |
| 5,535,208 A | | 7/1996 | Kawakami et al. | |
| 5,619,337 A | | 4/1997 | Naimpally | |
| 5,657,414 A | | 8/1997 | Lett et al. | |
| 5,710,773 A | | 1/1998 | Shiga | |
| 5,838,876 A | | 11/1998 | Iwamura | |
| 5,899,578 A | * | 5/1999 | Yanagihara et al. | 386/75 |
| 5,909,257 A | | 6/1999 | Ohishi et al. | |
| 5,933,430 A | | 8/1999 | Osakabe et al. | |
| 5,945,631 A | | 8/1999 | Henrikson et al. | |
| 6,366,731 B1 | * | 4/2002 | Na et al. | 386/83 |

FOREIGN PATENT DOCUMENTS

| | | |
|---|---|---|
| EP | 0 658 048 A1 | 6/1995 |
| EP | 0 703 713 A2 | 3/1996 |
| EP | 0 703 713 A3 | 3/1996 |
| JP | 7-327032 | 12/1995 |
| JP | 8-32644 | 2/1996 |
| JP | 9-233428 | 9/1997 |

* cited by examiner

*Primary Examiner*—Vincent F Boccio
(74) *Attorney, Agent, or Firm*—Sughrue Mion, PLLC

(57) ABSTRACT

A multi-media system for transferring a single program transport stream and a method therefor are provided. A receiver is for receiving a transport stream. For the receiver to control recording and reproduction performed by a recording/reproducing device, the receiver selects one program to constitute a single program transport stream and transfers the single program transport stream to the recording/reproducing device. Here, a program number is transferred, by correcting program association table (PAT) information of the transport stream. Accordingly, the recording/reproducing device can recognize the program number within the single program transport stream to be recorded. Therefore, the receiver can perform remote control of the recording/reproducing device without the extra transfer of the program number. Also, the receiver provides an on-screen graphic (OSG) to the recording/reproducing device, resulting in an OSG of consistent appearance.

26 Claims, 3 Drawing Sheets

DIGITAL BROADCAST RECEIVING/ RECORDING APPARATUS AND METHOD

Matter enclosed in heavy brackets [ ] appears in the original patent but forms no part of this reissue specification; matter printed in italics indicates the additions made by reissue.

*This is a reissue of Ser. No. 08/941,539, filed Sep. 30, 1997, U.S. Pat. No. 6,366,731, dated Apr. 2, 2002.*

BACKGROUND OF THE INVENTION

The present invention relates to a digital audio/video (A/V) apparatus, and more particularly, to a multi-media system in which a plurality of digital A/V apparatuses are connected to each other via a digital interface.

In a digital A/V apparatus, a device can be controlled by other devices, which could not be achieved in a conventional analog A/V apparatus. As an example, the High-Definition-Digital Video Cassette Recorder (HD-DVCR) Conference defines a command set which is called AV/C CTS (Audio/Video Control Command and Transaction Set) so that an operation command from a remote controller is transferred to a target control device (called "local device") via the IEEE 1394 serial bus. Here, the IEEE 1394 serial bus operates according to a standard related to high-speed data transfer, which is defined by the Institute of Electrical & Electronics Engineers (IEEE). The IEEE 1394 serial bus is used as an interface for connecting each device of a digital multi-media system, having an isochronous transfer mode and an asynchronous transfer mode. Here, A/V data is transferred in real time using the isochronous transfer mode, and transactions required for communication, including read, write and lock, are transferred in an asynchronous pattern using the asynchronous transfer mode. Also, control commands such as AV/C CTS are transferred in an asynchronous pattern using the asynchronous transfer mode.

However, the contents defined by AV/C CTS includes commands relating to a direct/indirect user's input button, but commands relating to all operations are not completed yet, and are still being updated. Also, commands related to the transfer of information which is not noticed by a user, or the notice of which is not necessary, are not yet provided. Thus, it is difficult to achieve a single common remote control for all devices.

On the other hand, according to the articles entitled "Specification of Consumer-Use Digital VCRs using 6.3 mm magnetic tapes-Part 8: ATV Specifications of Consumer-Use Digital VCR" and "Specification of Digital Interface for Consumer Electronic Audio/Video Equipment-Parts 1 & 4", which are published by the HD-DVCR Conference, it is prescribed that an advanced television (ATV) signal having MPEG2-TS (Moving Picture Experts Group 2-Transport Stream) which is transferred using the IEEE 1394 can be recorded by an HD-VCR using 6.3 mm magnetic tape. Particularly, it is prescribed to transfer the MPEG2-TS using the isochronous transfer mode of the IEEE 1394 while having a common format, i.e., common isochronous packet (CIP) header structure as in the case of a digital video cassette (DVC) called a camcorder. Here, the AV/C CTS is adopted as a control command. Also, the MPEG2 is roughly classified into one of three: MPEG2-system, MPEG2-video and MPEG2-audio. A transport stream (TS) and a program stream (PS) are defined as a transfer standard in the MPEG2-system.

FIG. 1 shows a typical example of data transfer between the ATV and HD-VCR. According to the definition by "Blue Book", published by the HD-DVCR Conference, including articles entitled "Specification of Consumer-Use Digital VCRs Using 6.3 mm Magnetic Tapes", "Specification of Digital Interface for Consumer Electronic Audio/Video Equipment", and "Specifications of AV/C Command and Transaction Set for Digital Interface", A/V data transferred from an ATV 10 to HD-VCR 20 which are connected by an IEEE 1394 cable 30 during a recording mode, is a multi-program MPEG2-TS, and data transferred from the HD-VCR 20 to the ATV 10 during a playback mode is a single program MPEG2-TS. Here, the term ATV refers to the American high definition television (HDTV) suggested by the Advanced Television Systems Committee (ATSC). Also, the AV/C CTS suggested in the Blue Book defines control commands with respect to VCR sub-devices, most of which relate to mechanical operation.

For example, commands from a remote controller 11 for the ATV 10, such as fast-forward and rewind, can be transferred to the HD-VCR 20 via the IEEE 1394 serial bus. However, control commands to the VCR sub-devices do not include commands for transferring information related to an MPEG2 system layer, e.g., program number.

Thus, the MPEG2-TS is transferred from the ATV 10 to the HD-VCR 20 during the recording mode. Here, the HD-VCR 20 should receive information required for parsing the MPEG2-TS being transferred from the ATV 10, from a user using a remote controller 21 for HD-VCR 20.

Also, the recorded single program MPEG2-TS is transferred from the HD-VCR 20 to the ATV 10 during the playback mode. Here, a program number recorded in a video auxiliary (VAUX) region should be transferred from the HD-VCR 20 to the ATV. Additionally, it is prescribed in the Blue Book to record the program number in the VAUX region of a tape.

However, the multi-media system of FIG. 1 requires a separate remote controller for each device connected to the ATV. That is, when a plurality of devices, being capable of recording/reproducing a received signal, are connected to the ATV, there is an inconvenience in that an operational command should be input to each recording/reproducing device by the user, using a different remote controller for each device.

Also, when selecting a program by parsing a program guide information (PG) for the MPEG2-TS in the multi-media system shown in FIG. 1, the HD-VCR 20 should first parse the program guide information in the multi-program MPEG2-TS transferred from the ATV. In order to display the parsed program guide information on an on-screen graphic (OSG) display, the OSG of the program guide information is transferred to the ATV 10 by being MPEG2-TS encoded since there is no OSG transfer standard in the IEEE 1394. Then, a user can input a program number corresponding to an intended program, using an up/down key of the remote controller 21 for the HD-VCR while viewing the OSG displayed on the ATV 10. Thus, this multi-media system requires an extra encoding circuit in the HD-VCR 20, for MPEG2-TS encoding the OSG, and the ability to parse the program guide information from MPEG2-TS in order to constitute the OSG. Also, the generation of the OSG is dependent on the VCR manufacturer, so it is difficult to provide the same OSG consistently. Although the ATV parses the program guide information in transferred MPEG2-TS and displays the parsed program guide information on an OSG display, and a user inputs a program number using the remote controller 11 for the ATV, the program number can be transferred to the HD-VCR 20, since no command is defined for transferring the program number to the HD-VCR 20.

SUMMARY OF THE INVENTION

To solve the above problems, it is an object of the present invention to provide a multi-media system which can be integrally controlled by one input device, by transferring to a recording/reproducing device only the transport stream of an intended single program, from among the transport stream of a multi-program received by a receiver.

It is another object of the present invention to provide a multi-media system for transferring a single program transport stream corresponding to an input program number to a recording/reproducing device, after a receiver parses program guide information in the MPEG2-TS and displays the parsed program guide information on an on-screen graphic (OSG) display.

It is still another object of the present invention to provide a method for transferring only the transport stream of an intended single program, from among the transport stream of a multi-program received.

To achieve the first and second objects, there is provided a multi-media system for transferring a single program transport stream comprising an input device, a receiver and a recording/reproducing device. The input device inputs a program number of an intended program, and the receiver having a first digital interface extracts a transport stream of a program corresponding to the program number from the received transport stream, and transfers the extracted transport stream as a single program transport stream together with a corrected program association table (PAT) including the program number and the program information corresponding thereto. Also, the recording/reproducing device having a second digital interface records the single program transport stream transferred from the receiver via the second digital interface, and reproduces the recorded single program transport stream, and transfers the reproduced single program transport stream to the receiver via the first digital interface. Here, the receiver may further comprise a program guide parser for parsing program guide information from the received transport stream, and an on-screen graphic (OSG) generator for displaying the parsed program guide information on an OSG display.

To achieve the third object, there is provided a method for transferring a transport stream from a receiver with a digital interface for receiving a transport stream to a recording/reproducing device with a digital interface for recording/reproducing a transport stream, the method comprising the steps of inputting a program number of an intended program to be recorded. Then, a program association table (PAT) from the received transport stream is corrected to output a corrected PAT including a program number corresponding to the input program number and program information corresponding to the program number, and then a transport stream corresponding to the input program number is extracted from the received transport stream, and transferred the extracted transport stream, as a single program transport stream together with the corrected PAT, to the recording/reproducing device.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

For convenience of explanation, an advanced television (ATV) will be described as an example of an MPEG2-TS broadcasting signal receiver, and a high definition videocassette recorder (HD-VCR) will be described as an example of an MPEG2-TS recording/reproducing device. However, any apparatus having a digital interface capable of transmitting/receiving an MPEG2-TS can replace the ATV, and any MPEG2-TS recording/reproducing device can replace the HD-VCR, for the purposes described below.

Figure 1:
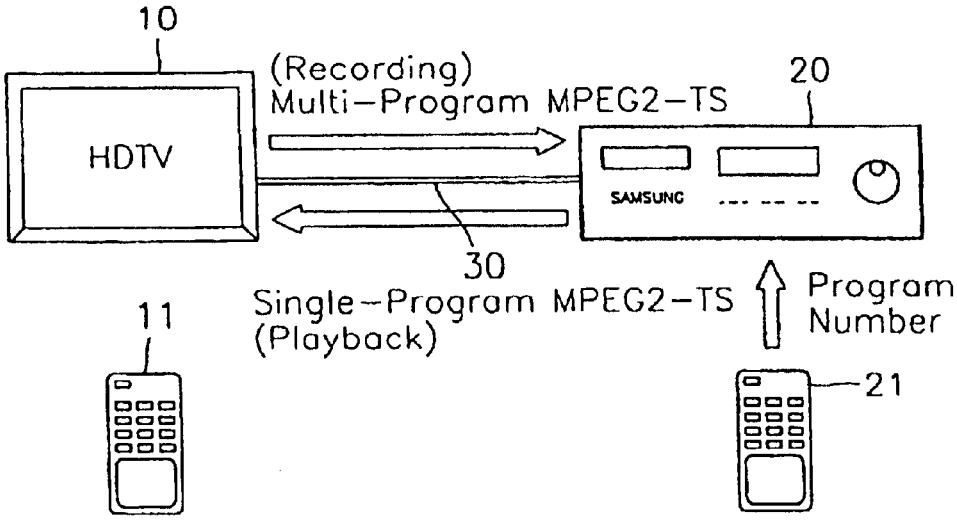
FIG. 1 (PRIOR ART)
FIG. 1 is a diagram illustrating a conventional method for MPEG2-TS transfer between an ATV and an HD-VCR.
Figure 2:
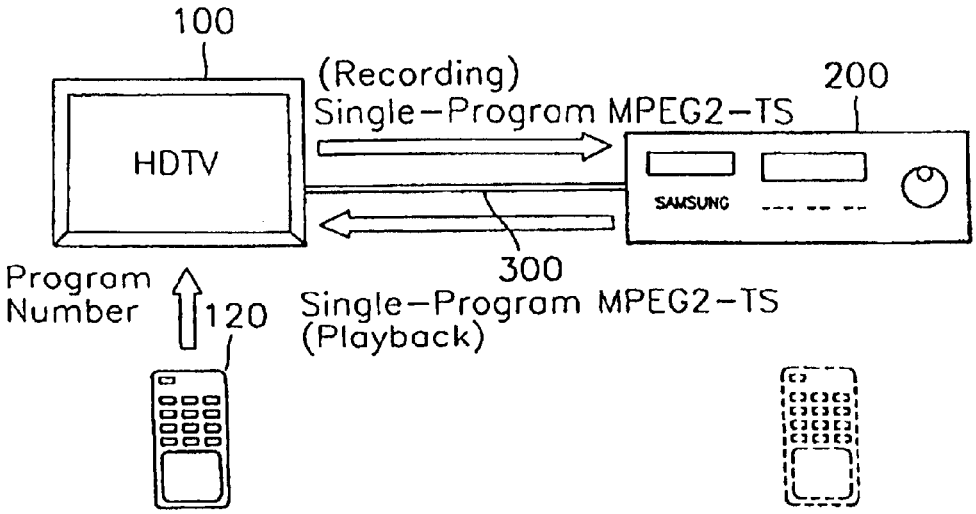
FIG. 2 is a diagram illustrating a method for MPEG2-TS transfer between an ATV and an HD-VCR according to the present invention.

Also, in order to simplify the structure of the multi-media system shown in FIG. 2, only an HD-VCR 200 and an ATV 100 are connected by an IEEE 1394 cable 300. However, other digital audio/video apparatuses may be connected to the ATV 100 and/or the HD-VCR 200 by the IEEE 1394 cable 300.

In the multi-media system of FIG. 2, one remote controller 120 for the ATV (ATV-remote controller) is used. During recording, a single program MPEG2-TS is transferred from the ATV 100 to the HD-VCR 200. Here, the single program MPEG2-TS, corresponding to a program number input by a user using the ATV-remote controller 120, is transferred from among the received multi-program MPEG2-TS. At the same time, program association table (PAT) information of the multi-program MPEG2-TS is corrected, and then the corrected PAT information for the single program MPEG2-TS is transferred. During playback, a single program MPEG2-TS is transferred from the HD-VCR 200 to the ATV 100.

Figure 3:
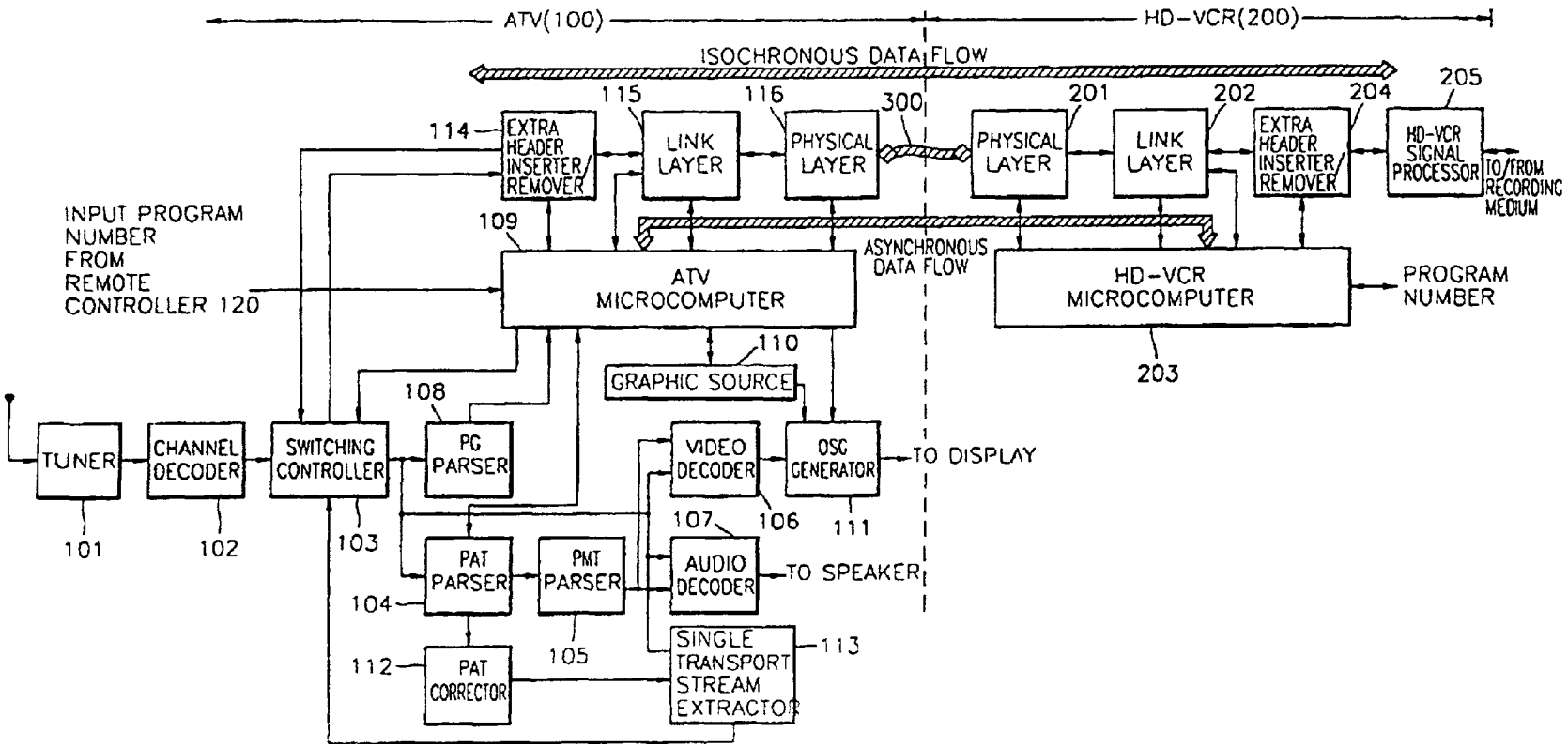
FIG. 3 is a block diagram of a transfer apparatus for a single program transport stream according to a preferred embodiment of the present invention.

FIG. 3 is a block diagram of a transfer apparatus for transferring a single program transport stream between the ATV 100 and the HD-VCR 200. In FIG. 3, a tuner 101 selects a frequency band of an intended program from the multi-program MPEG2-TS received via an antenna. A channel decoder 102 demodulates the received signal, removes an error correction code, and extracts the multi-program MPEG2-TS of the intended channel. Here, the MPEG2-TS corresponds to an MPEG2 system layer.

Here, the MPEG2 system layer will be described briefly for easy understanding of the present invention. One program is constituted of video information, audio information and user data information. According to the MPEG2-TS defined by the MPEG2 system layer, video data information, audio data information and user data information corresponding to a plurality of programs are time-division multiplexed into one stream. The MPEG2-TS includes program specific information (PSI) such that a receiver can properly parse the audio data information, video data information and user data information corresponding to an intended program during demultiplexing.

Most of the PSI is in table form, such as the program association table (PAT), program map table (PMT) and conditional access table (CAT). Here, the PAT and PMT are important. One PMT exists per program. In the PMT, packet identification numbers (PIDs) with respect to transport stream packets including a video stream and an audio stream of the corresponding program, are summarized by items. Here, the video stream of the program is represented by PID=XXXX, and the audio stream thereof is represented by PID=YYYY. The lengths of the transport stream packets are fixed at 188 bytes.

Since a plurality of programs exist in one transport stream (TS), a plurality of PMTs exist in the TS. Thus, a synthetic table is required for connecting each program of the TS with the PIDs of the PMT of each program. This synthetic table is called the "PAT". Since one program is expressed as one program number, items of the PAT are constituted of information giving the relationship between the program number (=XXXX) and the PMT PID.

Meanwhile, a PAT parser 104 extracts the PAT packet of the multi-program MPEG2-TS output from the channel decoder 102 to parse the PAT via a switching controller 103, and outputs the PMT PID of the program, corresponding to the program number which is selected by a user and output via an ATV microcomputer 109. Here, since the PAT PID is set to "0," the PAT is extracted by checking whether the PAT PID is equal to "0." Also, the PAT parser 104 checks whether the input signal is the multi-program MPEG2-TS, output from the channel decoder 102, or the single program MPEG2-TS, transferred from the HD-VCR 200 via an extra header inserter/remover 114. This check is based on the parsed PAT. The PAT parser 104 then outputs the result to the ATV microcomputer 109.

Figure 4:
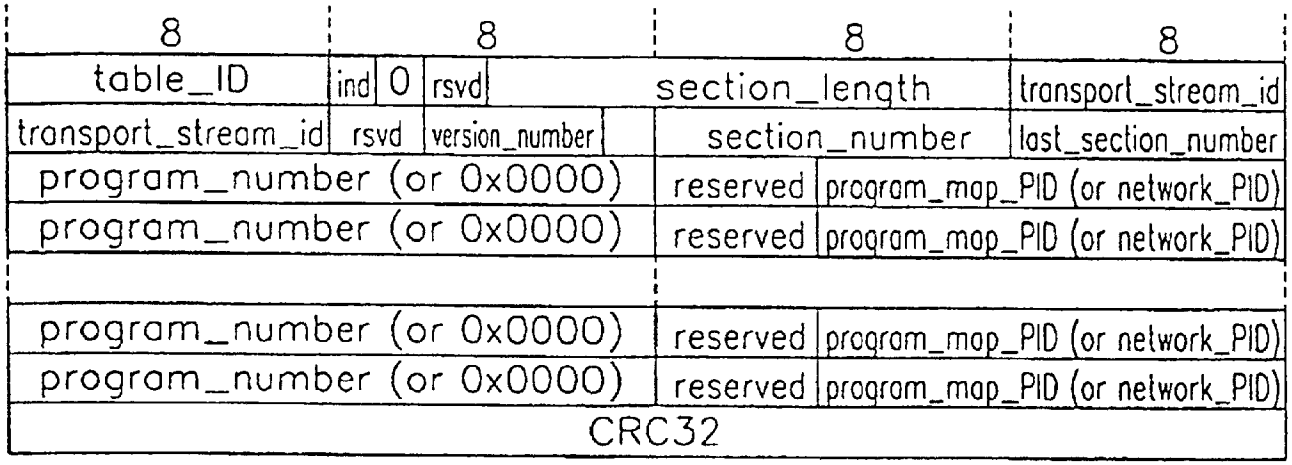
FIG. 4 is a diagram showing the structure of the PAT data received by the tuner of FIG. 3.

Here, the PAT of a received multi-program MPEG2-TS is shown in a table in FIG. 4. As shown in FIG. 4, the packet IDs of the PMTs, including information of the programs corresponding to each program number, are arranged in the PAT.

A PMT parser 105 receives the PMT PID from the PAT parser 104, and parses the PMT to extract a video PID (V_PID) and an audio PID (A_PID) of the parsed PMT. A video decoder 106 separates a video stream from the multi-program MPEG2-TS output from the channel decoder 102 according to the extracted V_PID, and decodes the separated video stream to display a decoded image signal on a display (not shown). An audio decoder 107 decodes an audio stream from the multi-program MPEG2-TS output from the channel decoder 102 according to the extracted A_PID, and outputs a decoded sound signal to a sound output device (not shown) such as a speaker.

A PG parser 108 parses program guide information (PG) from the multi-program MPEG2-TS output from the channel decoder 102 to output the result to the ATV microcomputer 109.

An on-screen graphic (OSG) generator 111 mixes the program guide information with a graphic signal used as a background screen, generated by a graphic source 110, or with the image signal decoded by the video decoder 106, under the control of the ATV microcomputer 109, to thereby display the result on the display. Here, a user inputs the number of an intended program using the ATV-remote controller 120. The OSG is reproduced by the ATV 100, and the same OSG is provided, regardless of the manufacturers of the connected apparatus. Also, it is unnecessary for an HD-VCR signal processor 205 of the HD-VCR 200 to parse the program guide information existing in the MPEG2-TS.

Here, an on-screen display (OSD) generator for generating program guide information may be adopted instead of the OSG generator 111. Also, all elements between the PAT parser 104 and the OSG generator 111 may be referred to as an ATV signal processor.

Meanwhile, during recording, a program number is required in order to extract a single program from the received multi-program MPEG2-TS. The program number is selected by a user, and is required for parsing the PAT and PMT information transferred to the MPEG2-TS. The program number is also required even when the transferred MPEG2-TS is a single program MPEG2-TS. This is because an MPEG2-TS syntax defined in the MPEG2 system layer has a common format for both the single program MPEG2-TS and the multi-program MPEG2-TS.

In the case of the conventional multi-program MPEG2-TS transfer, it is impossible for the HD-VCR 200 to extract a single program without the transfer of a program number. However, when the ATV 100 extracts a program, using the program number input by a user via the ATV-remote controller 120, and transfers the extracted program in the form of a single program MPEG2-TS together with a corrected PAT for the single program MPEG2-TS to the HD-VCR 200, the HD-VCR 200 can recognize the program number without needing the extra transfer of the program number. That is, when the single program MPEG2-TS is transferred from the ATV 100 to the HD-VCR 200, the HD-VCR 200 can automatically recognize the program number, since only one program number exists in the single program. Thus, even though the ATV 100, receiving the program number via the ATV-remote controller 120, does not transfer the program number, the HD-VCR 200 can recognize the PMT PID based on the corrected PAT and select intended audio and video packets based on the PMT. The above facts can also be applied during the playback mode.

Figure 5:
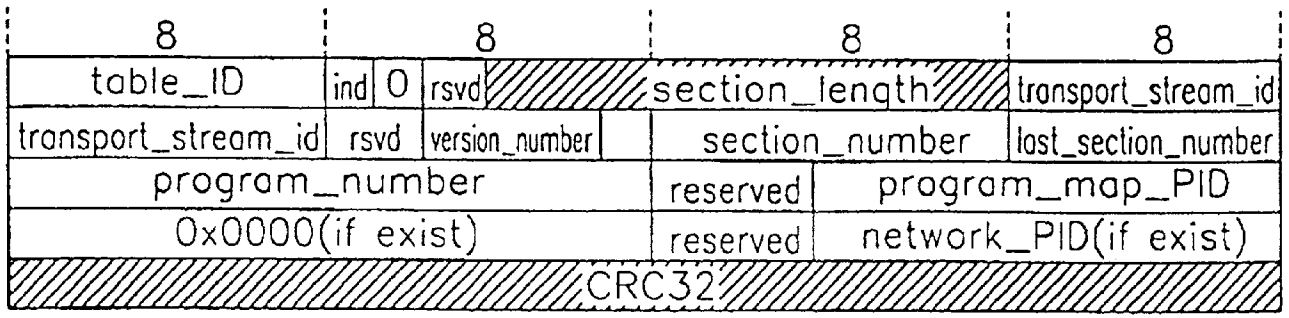
FIG. 5 is a diagram showing the structure of the PAT data corrected by the PAT corrector of FIG. 3.

Thus, a PAT corrector 112 of FIG. 3 corrects the PAT, to make it suitable for a single program MPEG2-TS transfer as shown in FIG. 5, based on the PAT parsed by the PAT parser 104. In comparison with the structure of the PAT received by the tuner 101 shown in FIG. 4, the corrected PAT structure shown in FIG. includes only a single program number, PMT PID corresponding to the single program number, an optional network PID, and an optional program number "0" for the network PID. Also, the corrected PAT structure differs from the PAT structure of FIG. 4 in the hatched regions, that is, the section length (section_length) and the error correction code (CRC32).

A single transport stream extractor 113 extracts the single program MPEG2-TS corresponding to an input program number from the multi-program MPEG2-TS output from the channel decoder 102, and outputs the extracted signal program MPEG2-TS, together with the PAT corrected by the PAT corrector 112, to the extra header inserter/remover 114.

Here, the switching controller 103 outputs the output of the channel decoder 102 to the PAT parser 104 and the PG parser 108 in a display mode, the single program MPEG2-TS output from the single transport stream extractor 113 to the extra header inserter/remover 114 in a recording mode, and the single program MPEG2-TS, transferred from the HD-VCR 200 and output by the extra header inserter/remover 114, to the PAT parser 104 and the PG parser 108 in a playback mode, according to a mode switching control signal output by the ATV microcomputer 109.

Meanwhile, a transaction layer, an IEEE 1394 serial bus management layer, a link layer 115 and a physical layer 116, which are various layers of the IEEE 1394 protocol, are referred to as a digital interface for the ATV. Here, the transaction layer and the IEEE 1394 serial bus management layer are installed in the ATV microcomputer 109 as software.

The HD-VCR 200 is roughly constituted of a digital interface including a physical layer 201, a link layer 202, a transaction layer and an IEEE 1394 serial bus management layer, an HD-VCR microcomputer 203, an extra header inserter/remover 204 and an HD-VCR signal processor 205. Here, the transaction layer and the IEEE 1394 serial bus management layer are installed in the HD-VCR microcomputer 203 as software.

The remote controller of the above-embodiment may include all input devices.

Next, the single program MPEG2-TS transfer via the IEEE 1394 serial bus, during the isochronous transfer mode, will be described.

(I) Recording Mode

The extra header inserter/remover 114 inserts a time stamp to allow the single program MPEG2-TS packets of 188 bytes including the corrected PAT, output from the single transport stream extractor 113, to be transferred via the IEEE 1394 interface. Then, the extra header inserter/remover 114 divides each TS packet, having the time stamp, into a block unit of a predetermined size (24 bytes), to constitute a data block packet for the IEEE 1394 transfer into which a CIP header has been inserted. The link layer 115 adds an isochronous header to the data block packet including the CIP header for the IEEE 1394 transfer, output from the extra header inserter/remover 114 to make the data block packet into an isochronous packet. The link layer 115 then converts the isochronous packet into a serial signal. The physical layer 116 converts the serial signal into an electrical signal.

The electrical signal is input to the physical layer 201 of the digital interface of the HD-VCR, via the IEEE 1394 cable 300. The physical layer 201 converts the electrical signal into digital data. The link layer 202 converts the digital data into parallel data of a 1-byte unit and then removes the isochronous header. The extra header inserter/remover 204 removes the extra header (CIP header), and makes the data into a TS packet to output to the HD-VCR signal processor 205. The HD-VCR signal processor 205 parses the corrected PAT from the single program MPEG2-TS packetized, and parses the PMT PID from the parsed PAT. Finally, all packets of the intended program are extracted, by parsing A_PID and V_PID from the PMT PID, and then recorded on a tape.

(II) Playback Mode

The HD-VCR signal processor 205 processes video and audio signals reproduced from the tape into TS packet. The extra header inserter/remover 204 inserts a time stamp into each TS packet processed by the HD-VCR signal processor 205, to allow the packet to be transferred via the IEEE 1394 interface. Then, the extra header inserter/remover 204 divides each TS packet having the time stamp into a block unit of a predetermined size (24bytes), to constitute a data block packet for the IEEE 1394 transfer into which a CIP header has been inserted. The link layer 202 adds an isochronous header to the data block packet including the CIP header for the IEEE 1394 transfer, output from the extra header inserter/remover 204 to make the data block packet into an isochronous packet. The link layer 202 then converts the isochronous packet into a serial signal. The physical layer 201 converts the serial signal into an electrical signal.

The electrical signal is input to the physical layer 116 of the digital interface of the ATV, via the IEEE 1394 cable 300. The physical layer 116 converts the electrical signal into digital data. The link layer 115 converts the digital data isochronous packet into parallel data of a 1-byte unit and removes the isochronous header. The extra header inserter/remover 114 removes the extra header (CIP header), and makes the data into a TS packet to output it to the PAT parser 104. The PMT parser 105 receives the PMT PID of the PAT, parsed by the PAT parser 104 based on the reproduced MPEG2-TS, to extract A_PID and V_PID. The video decoder 106 and the audio decoder 107 decode the video and audio signals according to the A_PID and the V_PID, to output the results to a display and a speaker, respectively.

The present invention adopts the MPEG2-TS as a transfer format. The apparatus for transferring a single program transport stream and the method therefor, according to the present invention, can be applied to all recording/reproducing devices adopting an MPEG2-TS demultiplexer/decoder, e.g., DVC having an MPEG2 encoder/decoder and D-VHS for the MPEG2-TS recording.

As described above, according to the apparatus is for transferring a single program transport stream and the method therefor, of the present invention, a single program transport stream corresponding to a program number selected by a user is transferred with a corrected PAT from the ATV to the HD-VCR, so that various digital A/V devices can be universally controlled by one apparatus, without the transfer of the program number. Also, the ATV provides the on-screen graphic (OSG), resulting in an OSG of consistent appearance.

What is claimed is:

1. A multi-media system for transferring a single program transport stream comprising:

an input device for entering a program number of an intended program;

a receiver including a first digital interface, the receiver receiving a multi-program transport stream and, when extracting only a single program transport stream of a program corresponding to the program number from the received multi-program transport stream, transferring the extracted single program transport stream together with a corrected program association table (PAT) including the program number and program information corresponding to the program number; and a recording/reproducing device including a second digital interface, for receiving the transferred extracted single program transport stream together with the corrected program association table and recording the single program transport stream transferred from the receiver via the second digital interface, for reproducing the recorded single program transport stream, and for transferring the reproduced single program transport stream to the receiver via the first digital interface, wherein receiving the single program transport stream together with the corrected program association table by the recording/reproducing device obviates need for a selection device associated with the recording/reproducing device to select a program for recording.

2. The multi-media system of claim 1, wherein the input device is a remote controller.

3. A multi-media system for transferring a single program transport stream, including at least a receiver for receiving a multi-program transport stream and a recording/reproducing device for recording/reproducing a selected single program transport stream, wherein the receiver comprises:

an input device for entering a program number of an intended program;

a first signal processor for parsing a program association table (PAT) from the received multi-program transport stream, and for separating a video stream and an audio stream of an intended program, based on the parsed PAT, to decode a video signal and an audio signal, respectively;

a PAT corrector for correcting the parsed PAT to output a corrected PAT including the program number and program information corresponding to the program number;

a single transport stream extractor, which, when extracting only the selected single transport stream corresponding to the program number from the received multi-program transport stream, outputs the selected single program transport stream, together with the corrected PAT; and a first digital interface for transferring the selected single program transport stream and said corrected PAT as isochronous packets, and wherein the recording/reproducing device comprises:

a second digital interface for depacketizing the single program transport stream transferred as the isochronous packets via the first digital interface; and a second signal processor for recording the selected single program transport stream, provided by the second digital interface, onto a recording medium, and for providing a reproduced single program transport stream reproduced from the recording medium to the second digital interface, wherein said transferring of said selected single program transport stream and said corrected PAT obviates need for a selection device associated with the recording/reproducing device to select a program for recording.

4. The multi-media system of claim 3, wherein the input device is a remote controller.

5. The multi-media system of claim 4, further comprising at least one additional recording/reproducing device connected to the receiver, wherein all of the recording/reproducing devices are controlled by the remote controller.

6. The multi-media system of claim 3, wherein the first and second digital interfaces are an IEEE 1394 interface, respectively.

7. The multi-media system of claim 6, wherein the receiver further comprises a first extra header inserter/remover for inserting an extra header into the selected single transport stream output from the single transport stream extractor, to form a data block packet for the IEEE 1394 transfer, and for removing the extra header inserted into the reproduced data block packet provided by the first digital interface for the IEEE 1394 transfer.

8. The multi-media system of claim 6, wherein the recording/reproducing device further comprises a second extra header inserter/remover for removing an extra header inserted into a data block packet provided by the second digital interface for the IEEE 1394 transfer, and for inserting the extra header into the reproduced single program transport stream output by the second signal processor, to form a data block packet for the IEEE 1394 transfer.

9. The multi-media system of claim 3, wherein the receiver further comprises a switching controller for selectively outputting the received multi-program transport stream to the first signal processor in a display mode, the selected single program transport stream output from the single transport stream extractor to the first digital interface in a recording mode, and the reproduced single program transport stream reproduced by the recording/reproducing device and received via the first digital interface to the first signal processor in a playback mode, according to a mode switching control signal.

10. The multi-media system of claim 3, wherein the first signal processor further comprises:

a program guide parser for parsing program guide information from the received multi-program transport stream; and an on-screen graphic (OSG) generator for displaying the parsed program guide information on an OSG display.

11. The multi-media system of claim 10, wherein the OSG generator generates an OSG by mixing the program guide information with a graphic signal of a background screen.

12. The multi-media system of claim 10, wherein the OSG generator generates an OSG by mixing the program guide information with the decoded video signal.

13. The multi-media system of claim 10, wherein the second signal processor does not, in itself, parse program guide information from the selected single program transport stream transferred via the second digital interface.

14. The multi-media system of claim 3, wherein the first signal processor further comprises:

a program guide parser for parsing program guide information from the received multi-program transport stream; and an on-screen display (OSD) generator for displaying the parsed program guide information on an OSD.

15. A method or transferring a single program transport stream from a receiver with a digital interface for receiving a multi-program transport stream to a recording/reproducing device with a digital interface for recording/reproducing a single program transport stream, the method comprising the steps of:

(a) providing a program number of an intended program to be recorded;

(b) correcting a program association table (PAT) from a received multi-program transport stream to output a corrected PAT including a program number corresponding to the program number provided in the step (a) and program information corresponding to the program number; and (c) extracting a single program transport corresponding to the program number provided in the step (a) from the received multi-program transport stream, and transferring the extracted single program transport stream together with the corrected PAT, to the recording/reproducing device, wherein receiving the single program transport stream together with the corrected program association table by the recording/reproducing device obviates need for a selection device associated with the recording/reproducing device to select a program for recording.

16. The method of claim 15, wherein the step (a) comprises the steps of:

(a1) parsing program guide information within the transport stream;

(a2) displaying the parsed program guide information; and (a3) providing the program number of an intended program according to the displayed program guide information.

17. The method of claim 16, wherein the step (a2) comprises displaying the parsed program guide information on an OSG display.

18. The method of claim 16, wherein the step (a2) comprises displaying the parsed program guide information on an OSD display.

19. The method of claim 15, further comprising the steps of:

(d) providing a program number of an intended program to be reproduced; and (e) transferring to the receiver a single program transport stream reproduced by the recording/reproducing device, corresponding to the program number provided in the step (d).

20. A multi-media system for transferring a single program transport stream comprising:

an input device for entering a program number of an intended program; and a receiver including a digital interface, for receiving a multi-program transport stream and extracting a single program transport stream of a program corresponding to the program number from the received multi-program transport stream, and for transferring the extracted single program transport stream together with a corrected program association table (PAT) including the program number and program information corresponding to the program number, wherein transferring the extracted single program transport stream together with the corrected program association table to a recording/reproducing device obviates need for a selection device associated with the recording/reproducing device to select a program for recording.

21. A multi-media system for transferring a single program transport stream, including a receiver for receiving a multi-program transport stream, the receiver comprising:

an input device for entering a program number of an intended program;

a first signal processor for parsing a program association table (PAT) from the received multi-program transport stream, and for separating a video stream and an audio stream of an intended program, based on the parsed PAT, to decode a video signal and an audio signal, respectively;

a PAT corrector for correcting the parsed PAT to output a corrected PAT including the program number and program information corresponding to the program number;

a single transport stream extractor for extracting the selected single transport stream corresponding to the program number from the received multi-program transport stream, to output the selected single program transport stream, together with the corrected PAT; and a digital interface for transferring the selected single program transport stream, wherein transferring the selected single program transport stream together with the corrected program association table to a recording/reproducing device obviates need for a selection device associated with the recording/reproducing device to select a program for recording.

*22. A method for transferring a single program transport stream from a receiver with a digital interface for receiving a multi-program transport stream to a recording/reproducing device with a digital interface for recording/reproducing a single program transport stream, the method comprising the steps of:*

*(a) providing a program selection information of an intended program to be recorded;*

*(b) correcting an association table from a received multi-program transport stream to output a corrected association table including a program number corresponding to the program selection information provided in the step (a) and program information corresponding to the program number; and*

*(c) extracting a single program transport stream corresponding to the program number provided in the step (a) from the received multi-program transport stream and transferring the extracted single program transport stream together with the corrected association table, to the recording/reproducing device;*

*wherein receiving the single program transport stream together with the corrected association table by the recording/reproducing device obviates need for a selection device associated with the recording/reproducing device to select a program for recording.*

*23. The method of claim 22, wherein the step (a) comprises the steps of:*

*(a1) parsing program guide information within the transport stream;*

*(a2) displaying the parsed program guide information; and*

*(a3) providing the program selection information of an intended program according to the displayed program guide information.*

*24. The method of claim 23, wherein the step (a2) comprises displaying the parsed program guide information on an OSG display.*

*25. The method of claim 23, wherein the step (a2) comprises displaying the parsed program guide information on an OSD display.*

*26. The method of claim 22, further comprising the steps of:*

*(d) providing a program selection information of an intended program to be reproduced; and*

*(e) transferring to the receiver a single program transport stream reproduced by the recording/reproducing device, corresponding to the program selection information provided in the step (d).*

* * * * *